J. G. Dillaha.
Horse Power.
Nº 90,245. Patented May 18, 1869.
Fig. 1.
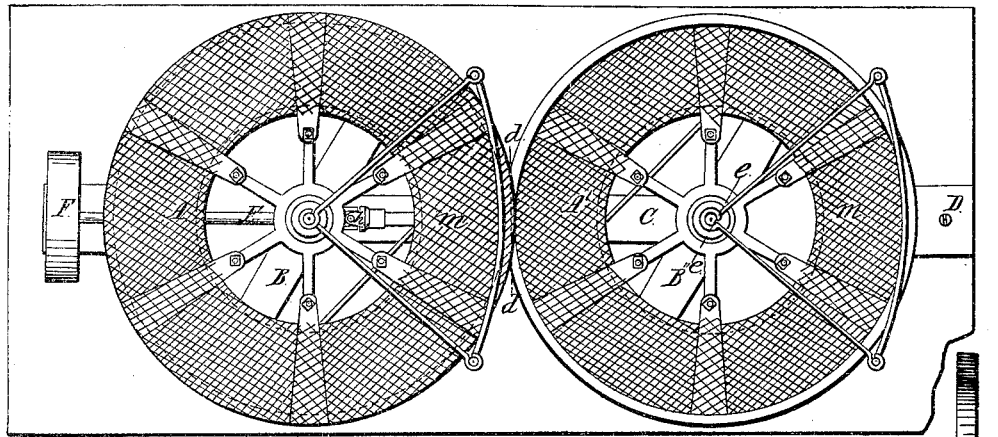
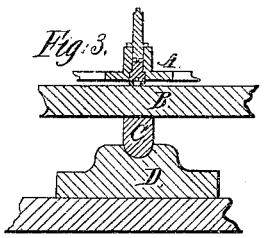
Fig. 3.
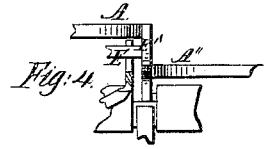
Fig. 4.
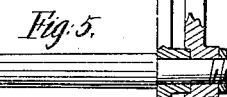
Fig. 5.
Fig. 2.
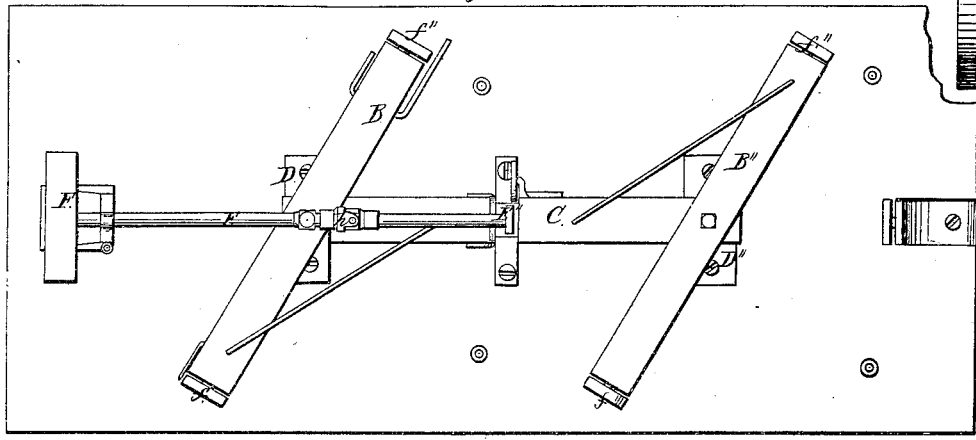
Witnesses:
A. H. Sherburne
T. J. Christy
Inventor:
J. G. Dillaha

United States Patent Office.

J. G. DILLAHA, OF WACO, TEXAS.

Letters Patent No. 90,245, dated May 18, 1869.

IMPROVED HORSE-POWER.

The Schedule referred to in these Letters Patent and making part of the same.

*To all whom it may concern:*

Be it known that I, J. G. DILLAHA, of Waco, in the county of McLennan, and State of Texas, have invented a new and useful Improvement in Horse-Powers; and I do hereby declare the following to be a full, clear, and exact description thereof, reference being had to the accompanying drawings, and to the letters of reference marked thereon, making a part of this specification, in which—

Figure 1 is a plan view of my invention;

Figure 2 is a plan view of the frame, with the driving-wheels removed;

Figure 3 is a vertical transverse section, on line *e e*;

Figure 4 is a vertical section on line *d d*; and

Figure 5 is a section of a portion of the truck employed in moving the power, with one of the driving-wheels attached, showing the same when the outer rim is removed.

Similar letters of reference, where they occur in the separate figures, denote like parts in each of the drawings.

My invention relates to an improvement in that class of powers known as tread-powers; and The nature of my improvement consists—

First, in two horizontal wheels, so arranged as to come in contact with or gear into a pinion revolving between the outer rim thereof, as will be hereinafter more fully explained;

Second, in so constructing the frame-work of the power that the driving-wheels may be held horizontally thereon when a draught-power is required, or, by tilting one end of cross-bars supporting the wheels upward, the wheels are given an oblique angle, thus forming a cheap and convenient tread-power; and Third, in the novel manner of constructing the driving-wheels, whereby the outer portion, or, in other words, that portion of the wheel forming the platform, may be removed, and the inner portion thereof used as wheels of a truck, as will be hereinafter more fully explained.

To enable others skilled in the art to make and use my invention, I will proceed to describe the same with reference to the drawings.

A and A″ represent the driving-wheels, which are pivoted to the centre of cross-bars B and B″.

Said bars extend across, and are provided, at their ends, with friction-rollers *f* and *f″*, upon which the outer rim of the wheels is supported.

The centre of said cross-bars is pivoted to the ends of bed-piece C.

The ends of said bed-piece, at the bottom thereof, are made round, which fit into grooves cut in the upper side of head-blocks D D″, which are firmly fastened to the earth or floor upon which the power is placed.

The object of securing bed-piece C to the head-blocks, as described, is to allow the same a rocking movement, which tilts the end of cross-bars B and B″ upward. Thus wheels A and A″ are brought to any suitable oblique angle to correspond with or be operated by the weight of the animals upon the wheels when said power is operated by weight.

E represents a horizontal shaft, which passes under wheel A, and is provided, at the inner end, with a pinion, E″, which comes in contact with or against the lower side of the rim of wheel A, and the upper side of the rim of wheel A″.

Said shaft is held in position by means of suitable bearings, and is provided, at its outer end, with a band-wheel, F, which communicates with the machine, to be operated by means of a belt.

Said shaft E is provided, at or near its centre, with a universal joint, or knuckle, *h*, as shown by figs. 1 and 2.

I have said that pinion E″ comes in contact with or between the rims of wheels A and A″, and is given a rotating motion, by means of friction, which may be done, or the rim of said wheels may be provided with cogs, which gear into like cogs on said pinion.

Wheels A and A″ are so constructed that the outer portion, or that part forming track or platform, may be removed, and the centre portion of the wheel removed from the power and attached to a truck, for the purpose of moving said power, or the parts thereof.

The operation of my power is as follows:

The wheels are first set at any suitable angle. The animals to operate the power are placed upon the same at *m m*, their heft causing said wheels to rotate, which communicate with pinion E″ of shaft E, giving the same a rotating motion.

Having thus described the nature and object of my invention,

What I claim as new, and desire to secure by Letters Patent, is—

1. The wheels A and A″, constructed substantially as and for the purpose set forth.

2. The combination of wheels A A″ and pinion E″, arranged substantially as and for the purpose set forth.

3. The combination of cross-bars B B″ and bed-piece C, when arranged to operate in the manner and for the purpose described.

J. G. DILLAHA.

Witnesses:
 N. H. SHERBURNE,
 T. J. CHRISTY.